United States Patent [19]
Galanski

[11] Patent Number: 5,795,051
[45] Date of Patent: Aug. 18, 1998

[54] TRUCK LIGHTING SYSTEM

[76] Inventor: Norman D. Galanski, 4316 Thatch Ave., Bakersfield, Calif. 93313

[21] Appl. No.: 775,327

[22] Filed: Dec. 31, 1996

[51] Int. Cl.⁶ .................................................. B60Q 1/24
[52] U.S. Cl. ........................... 362/80; 362/61; 362/83.3; 362/234; 362/154
[58] Field of Search ........................... 362/61, 80, 83.3, 362/234, 154, 253

[56] References Cited

U.S. PATENT DOCUMENTS

| | | | |
|---|---|---|---|
| 4,192,427 | 3/1980 | Bergman | 212/271 |
| 4,839,629 | 6/1989 | Brown | 340/468 |
| 4,896,136 | 1/1990 | Hotovy | 340/468 |
| 5,121,306 | 6/1992 | Palmisano | 362/80 |

*Primary Examiner*—Stephen F. Husar
*Attorney, Agent, or Firm*—Beehler & Pavitt

[57] ABSTRACT

A lighting system for use with trucks having an open bed or one covered by a shell include a U-shaped channel support member on which is mounted quartz halogen lamps. The support member is mounted on the side walls of the truck and across the front wall of the bed such that the lights are below the top surface of the side walls. In this way the lights are positioned to illuminate the open or covered bed while not shining above the top of the side walls or closed tail gate. The on/off control of the lights is by a switch located in the cab of the truck. The lighting system is easy to install, attractive in appearance and operated to protect the front wall of the bed from damage.

10 Claims, 3 Drawing Sheets

TRUCK LIGHTING SYSTEM

FIELD OF INVENTION

This invention relates to vehicle lighting systems and more particularly to an improved lighting system for installation and use in open back sports and utility trucks.

BACKGROUND OF THE INVENTION

In recent years there has been an increased use of trucks as a mode of personal transportation as contrasted to sedan type vehicles. In part, the increase is due to the desire for a vehicle that is somewhat mere versatile than a sedan in that it allows one to carry cargo and tends to be more utilitarian than a sedan. In fact, the use of trucks has become so popular that many of the truck owners have spent considerable sums to improve the appearance of their vehicles and to add to the vehicle items not offered by the original manufacturer.

While increasingly popular, however, there are some shortcomings in the use of an open back sport or utility truck having a cab and an open back with side walls and a drop down rear gate. One of the shortcomings is the need to light the truck bed. While lights are sometimes placed on rollover bars, either structural or decorative, normally located to the rear of the cab and in the truck bed adjacent the cab, these lights, if facing to the rear, cannot be turned on when the truck is in motion. In many states, it is unlawful to mount lights above a truck bed such that the lights face to the rear since if the lights are turned on while the vehicle is in motion, the result is that the driver of the vehicle to the rear of the of the truck may be blinded by the lights. In some states, such as California, even if facing to the front, the lights above the cab must have a cover over them to prevent them from blinding an oncoming driver.

While may of the trucks have cargo lights usually mounted at the top and on the rear of the cab, these lights are not really effective in illuminating the truck bed. If there is a shell over the truck bed, the cargo light is not capable of illuminating the region under the shell. It is also the case that many, if not all, trucks do not have rearward facing lights and thus it is difficult to see what is in the truck bed or to have sufficient illumination for lighting the rear bed. Such illumination is quite convenient, especially if one does not have a cargo bay light or a "stock" light which is less than illuminating of the entire rear of the truck bed. More often than not, when it is dark, one must use a flash light to see what is in the bed of the truck. This is oftimes considered to be an inconvenience.

It is thus apparent that a need exists for truck lighting which illuminates the truck bed and the region in the area of the truck bed, but which is not positioned in such a manner that the lights will "blind" the vehicle to the rear of the truck if the truck lighting is left on.

A need also exists for a truck lighting system which can be installed on currently existing trucks and which offers the advantages of providing appropriate lighting, is decorative in nature, sufficiently strong to stand on, which is capable of supporting other items such as cellular phone or radio antenna and which offers some protection of the front bed panel of the truck.

It is also apparent that there is a need for a truck bed lighting system which is easy to install, effective in operation and which is pleasing in appearance and which generally improves the overall appearance of the truck.

BRIEF DESCRIPTION OF THE INVENTION

In accordance with this invention, an improved and relatively simple lighting system for open bed trucks is provided which is relatively simple to install, effective in illumination and attractive in appearance.

The lighting system of this invention, which may be original equipment and integrated into the front bed panel, or installed as an after market item, generally includes a channel shaped support member for at least two quartz halogen lamps, although more may be used depending on the need. Regardless of the number of lamps, the support member is located in the portion of the bed to the rear of the cab or what amounts to the front of the bed. Normally a truck bed for sports and utility trucks includes a floor or bottom wall, a front wall to the rear of the cab, side walls and a tail gate moveable from a closed to a down position. The lighting system of this invention is preferably supported by the side walls and against the front wall of the bed.

The orientation of the lighting system is such that the top wall of the support member is positioned so as to be level with the top of the side and front wall of the truck bed. The support member preferably extends between the side walls of the bed and is secured thereto as will be described. Carried by the support member are the quartz halogen light assemblies which may be controlled by a light switch located in the cab.

By locating the lighting support member as described, it is assured that the light assemblies are vertically below the top of the side and front wall as well as the top of the tail gate. Oriented in this fashion, the lights themselves do not extend above the walls of the truck bed and cannot "blind" a trailing vehicle, provided the tail gate is in the up position. When used, the lights easily illuminate the entire truck bed but are not annoying in the sense that they illuminate regions above the cab, as is the case with lights mounted on structural or decorative roll over bars.

In one form, the supporting channel includes an upper section which overlies the side walls of the truck bed as opposed to being supported between the side walls. Regardless of the details of mounting the lighting system is sufficiently strong to support the weight of a person, is relatively easy to install and is attractive. It is understood that the actual dimensions of the lighting system may vary since the dimensions of truck beds may vary from model to model of truck depending on the manufacturer and style of truck. However, because of the relative simplicity of the structure of the lighting system, it is relatively easy to provide a unit which easily fits any particular truck model.

It will be apparent from the following description which should be read together with the accompanying drawings that there are other advantages of the present invention as is apparent from the disclosed preferred embodiments of the various forms of this invention and that the accompanying detailed description should be read as not limiting the present invention, but as explaining the same.

DETAILED DESCRIPTION OF THE INVENTION

Figure 1:
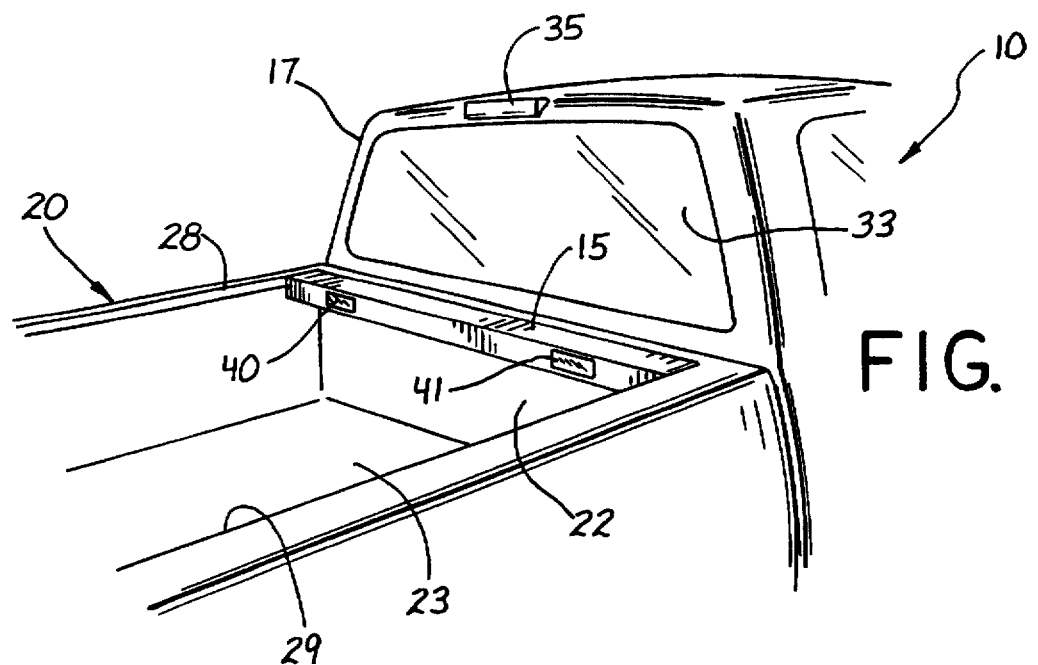
FIG. 1 is a view in perspective illustrating the lighting system of this invention installed in a truck with an open bed.

Referring to the drawings which illustrate preferred forms of the present invention, FIG. 1 illustrates in diagrammatic fashion a truck 10 on which is installed the lighting system 15 of this invention. The truck may be any of a variety of domestic or foreign made trucks and includes a cab 17 and a truck bed 20 having a front wall 22 to the rear of the cab 17, a floor 23 a tail gate not shown and side walls 28 and 29. As shown the top sections of each of the side walls and front wall and tail gate are all at essentially the same level, and vertically above the floor 23. The side walls include a channel member running the length of the side wall for strength purposes and to provide a region for openings such as 31 (FIG. 4) for mounting of various items. The front wall 22 of the bed also includes a channel, not shown, which includes a lower angled wall.

The truck bed is located vertically below the cab window 33. In this illustration one can see the cargo light 35 located at the top center of the rear of the cab. The cargo light is operated from the cab. It is also clear that if there is a shell over the bed, the cargo light is not effective in illuminating the interior of the shell.

The lighting system 15 of this invention, as shown in FIG. 1, is located between the side walls 28 and 29, vertically above the floor of the bed and below the cab window. It is also located such that the top of the lighting system is even with the top of the side walls and front wall of the bed. In this orientation, the quartz halogen lamps 40 and 41 supported by the lamp support 45 are positioned below the top of the side walls and front wall of the bed. This also positions the lamps below the tail gate 25 such that the latter tends to prevent the lamps from shining back or form being seen if the tail gate is in the closed (up) position. Since the lights are not above the top of the side walls they are legal even in California and need not be covered. However, it is also apparent that even if there is a shell over the bed, the lamps are located in a manner by which they may illuminate the interior of the covered bed. In the absence of a shell, the lamps fully illuminate the truck bed.

As seen in FIG. 1, the lighting system 15 is located above the floor 23 but does not cover the entire surface area of the front wall 22, the portion of that wall below the lighting system 15 being exposed. By this arrangement, some protection is afforded by the lighting system in preventing items form contacting the expose surface of the front wall since the lighting system acts as a bumper. It is also apparent that one can stand on the lighting system which makes it easier to wash the top of the cab without the need for a ladder, especially in the case of extended cab trucks.

Figure 2:
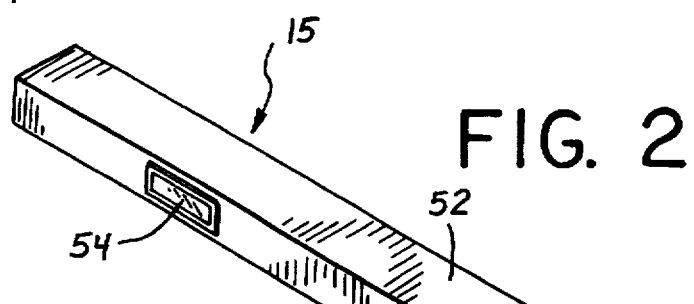
FIG. 2 is view in perspective of the lighting system of this invention prior to installation.
Figure 3:
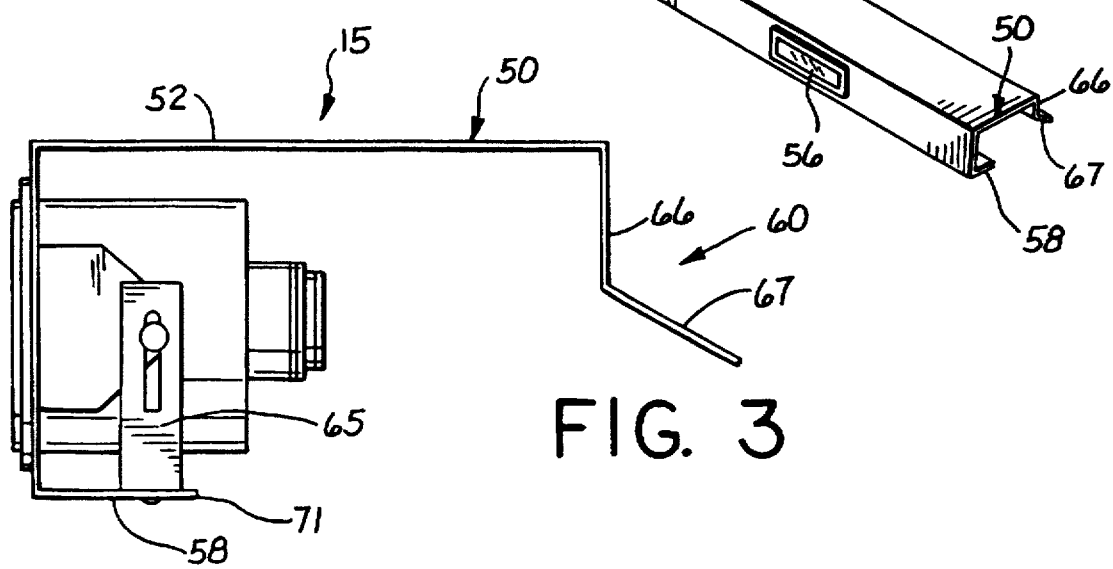
FIG. 3 is an end view of the lighting system of this invention.

Referring to FIGS. 2 and 3, the lighting system 15 include a channel shaped support member 50 made of s suitable metal such as aluminum or the like. The support member includes a top wall 52 which, after installation, is at the same, even level with the top of the side walls and front wall of the bed. The front wall 52 of the support member faces to the rear of the vehicle and supports two spaced quartz lamps 54 and 56. As seen the lamps are below the top wall 52 and thus below the top surface of the side walls. The support member also includes a bottom wall 58 which does not fully close the channel, but which terminates short of the rear wall 60. As shown, the bottom wall supports a bracket assembly 65 on which the lamps are mounted.

The rear wall 60 includes two sections, section 66 which is in spaced parallel relation to the front wall 52 and a second section 67 which is at a 60 degree angle towards the front wall of the bed. This angle may vary depending on the make, model and year of the truck. The wall section 67 is angled so as to match the contour of the hollow rein forcing section which usually extends across the rear wall of the bed. Once assembled, w all section 66 is in contact with t he vertical portion of the front wall while angled section 67 is in contact with the angled lower section of the transversely extending reinforcing section of the front wall of the bed.

The length of the lighting support member typically is such that it will fit snugly between the side walls of the truck. This dimension may vary depending on the truck. The top wall axial dimension (front to rear) may be of the order of 4 inches, while the bottom wall front to rear dimension may be about 1.5 inches. The vertical dimension of wall section 66 may be 1 inch while that of the angled section 67 may also be 1 inch. With these dimensions, the open space between the inside end 71 of the bottom wall and the wall section 66 is about 2.5 inches. This clearance is sufficient to permit access to the interior of the support channel to mount the lamps 54 and 56. It is to be understood that additional lamps may be used in line or below 54 and 56.

Figure 4:
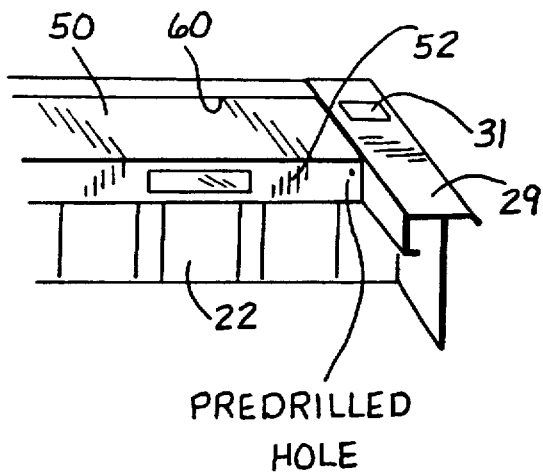
FIG. 4 is a diagrammatic view of one step in the installation procedure.
Figure 5:
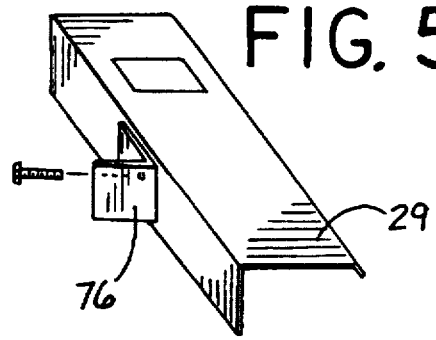
FIG. 5 is a diagrammatic view of another step in the installation procedure.
Figure 6:
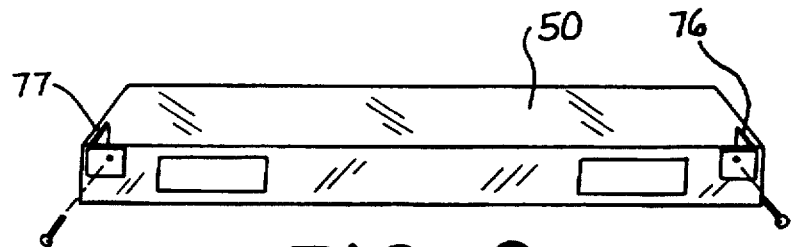
FIG. 6 is a diagrammatic view of the last step in the installation procedure.

Referring now to FIGS. 3 to 6 inclusive where the same reference numerals already used are used again, the installation of the lighting system 15 in a truck 10 may be understood. The first step, as shown in FIG. 4 is to place the support member 50 between the side walls 28 and 29 of the truck, care being taken to assure that the rear wall 60 is in contact with the front wall 22 of the bed. Using a pencil or tape, the intersection of the front wall 52 and each of the side walls is marked. After marking, the support member 50 is removed and angle brackets 76 and 77 (FIG. 6) are positioned on the side walls 28 and 29. The angle brackets, typically of aluminum, should be oriented such that one wall faces to the rear of the truck and is located ¹⁄₁₆ of an inch back from the mark and the bracket is positioned about ¹⁄₁₆ of an inch below the top surface of the side wall. Thus positioned, as shown in FIG. 5, the top of the support member will be even with the top surface of the side walls and the ¹⁄₁₆ front-to-rear and top adjustment will allow for the thickness of the support member stock and assure a tight fit to the front wall of the bed and an even location relative to the top of the side walls. The angle brackets may be secured using self tapping screws.

In the next steps, the support member is fitted over the brackets with the angled back wall 67 properly positioned in mating position with the reinforcing roll which extends transversely along the top of the front wall and the vertical wall section in contact with the front flat face of the reinforcing roll. Thus positioned, the brackets are in the relative position shown in FIG. 6. At this point, three self tapping screws, evenly spaced along the support member are driven through the angled section 67. Access to accomplish this is through the clearance between the inside end 71 of the bottom wall and the angled wall. Once secured, self tapping screws are inserted and driven through the front wall 52 of the support member, pre-drilled openings (see FIG. 4) being provided to accomplish this.

Figure 7:
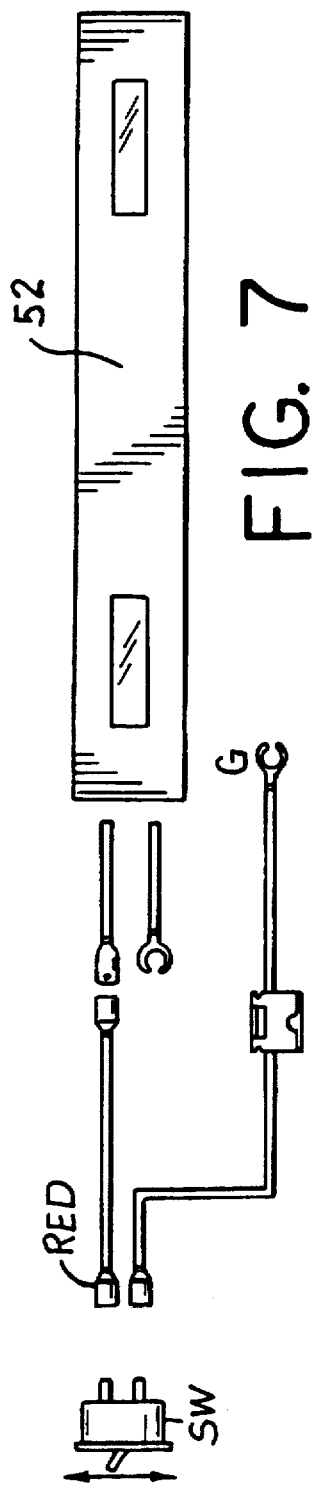
FIG. 7 is an illustration showing the wiring installation of the lighting system of this invention.

The electrical hook-up may be accomplished any one of several ways. One simple manner is to use the cargo light system, if one is installed and operative. Here, all that is necessary is to bring the wires into the cab and make the proper connections. Another installation, shown in FIG. 7, may be used where it is necessary to install a switch inside the cab. In this installation, the battery is disconnected and a location of the switch plate SW inside the cab is determined. Two holes are drilled for the switch plate and sheet metal screws are used to mount the plate. The lighting system wiring includes a spade end on a red fuse wire and this is connected to the supply terminal on the switch, as shown. Next, a power hook-up is determined. This may be done through the fuse box by connecting to the terminal marked "battery"; care should be taken not to connect to an accessory terminal.

If the fuse box cannot be used, a connection can be made through the firewall, in which event a small hole is drilled through the firewall and a wire is run through the hole making sure not to damage anything on the other side of the firewall. The wire is easily connected to the battery with an end connector. Next, the spade end of the red wire is attached to the light terminal switch. A path is then located between the switch and the lighting system that will not interfere with moving parts and not be in a "pinch" path. One should allow enough slack for frame and bed flex. The wire is then connected to the lighting system and the ground wire G is attached to the frame.

Figure 9:
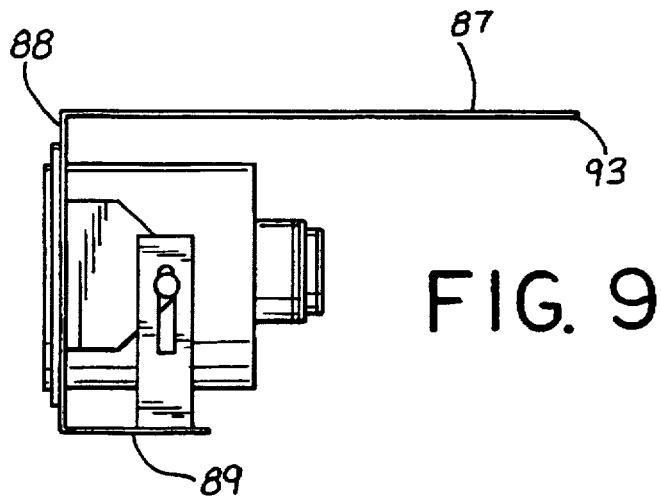
FIG. 9 is a view in section of the form of invention shown in FIG. 8.
Figure 8:
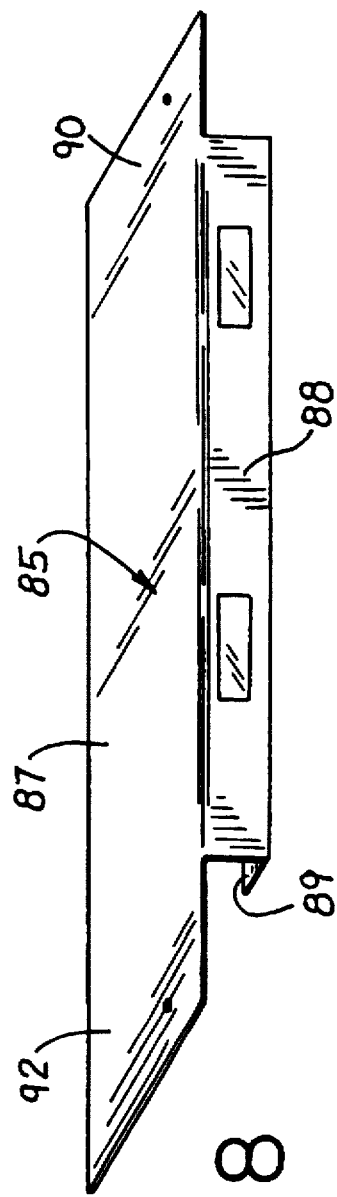
FIG. 8 is a view in perspective of another form of the lighting system of the present invention.

Referring to FIGS. 8 and 9, another form of the lighting system 80 of the present invention is illustrated. In this form the support member 85 is again generally a U-shaped channel and includes a top wall 87, a front wall 88 and a bottom wall 89. The quartz halogen lights are mounted in the from wall by the use of brackets, as already described, see FIG. 9. In this form, there is no back wall and the top wall includes lateral extensions 90 and 92 which fit over the top surface of the side walls with the end 93 butting against the front wall of the bed. Apertures are provided at each end of the extensions for screw which affix the support to the top of the side walls. This particular form may be used where the truck bed structure does not lend itself to mounting of the lighting systems already described. When correctly installed, this form of lighting system has all of the advantages of that already described.

It is apparent from the above detailed description of the invention that a relatively simple and effective lighting system for trucks is provided. It is to be understood, however, that the above description is for explanation purposes and modifications may be made to the invention by those having ordinary skill in this are without departing from the scope of this invention as set forth in the appended claims.

What is claimed is:

1. A lighting system for a truck wherein the truck includes a cab and a truck bed to the rear of the cab, the truck bed including a bottom wall and side walls having a top section and a front wall to the rear of the cab and a tail gate moveable between a closed and down position and the tail gate having a top section which is at about the same level as the top of the side walls, the lighting system comprising:

a light supporting member supported between the side walls of the truck and in contact with the front wall of the truck bed, the supporting member including an upper wall portion which is at essentially the same level as the top section of the side walls, separate spaced light means supported by said supporting member and positioned below the top section of said side wall such that the lights are located below the top section of said tail gate, and switch means located in the cab for turning said lights on and off whereby said lights when turned on illuminate the truck bed.

2. A lighting system for a truck as set forth in claim 1 wherein said light supporting member extends to the rear of the front wall of the truck bed such that the lights are located vertically below the upper wall portion of the supporting member and to the rear of the front wall of the bed.

3. A lighting system for a truck as set forth in claim 1 wherein said supporting member is a generally U-shaped channel which is secured to the side walls of the truck bed.

4. A lighting system for a truck as set forth in claim 3 wherein said supporting member includes a channel portion received between the said side walls and an upper wall laterally extending portion which overlies a portion of the top surface of the side walls to the rear of the front wall of the bed.

5. A lighting system for a truck as set forth in claim 1 wherein said supporting member includes a bottom wall which is spaced from the bottom wall of the truck bed so as to extend to the rear of the truck bed thereby providing protection by preventing contact by items in the truck bed with that potion of the rear wall which is vertically below the bottom wall of the supporting member.

6. A lighting system for a truck as set forth in claim 3 wherein the U-shaped channel member includes a bottom wall and a back wall, the latter including an angled section.

7. A lighting system for a truck as set forth in claim 6 wherein an access space is provided between the end of the bottom wall and the back wall.

8. A lighting system for a truck as set forth in claim 7 further including bracket means for supporting said light means on said bottom wall.

9. A lighting system for a truck as set froth in claim 8 further including angle bracket means for mounting the support member to the side walls of the truck.

10. A lighting system for a truck as set froth in claim 1 further including switch means located in the cab of the truck for controlling the on/off condition of the lights.

* * * * *